United States Patent
Govindarao

(10) Patent No.: US 9,232,199 B2
(45) Date of Patent: Jan. 5, 2016

(54) METHOD, APPARATUS AND COMPUTER PROGRAM PRODUCT FOR CAPTURING VIDEO CONTENT

(71) Applicant: Nokia Corporation, Espoo (FI)

(72) Inventor: Krishna Annasagar Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 60 days.

(21) Appl. No.: 13/923,641

(22) Filed: Jun. 21, 2013

(65) Prior Publication Data

US 2013/0342740 A1 Dec. 26, 2013

(30) Foreign Application Priority Data

Jun. 22, 2012 (IN) .......................... 2494/CHE/2012

(51) Int. Cl.
| | |
|---|---|
| H04N 9/09 | (2006.01) |
| H04N 5/217 | (2011.01) |
| H04N 7/01 | (2006.01) |
| H04N 5/225 | (2006.01) |
| H04N 5/232 | (2006.01) |
| H04N 5/235 | (2006.01) |
| H04N 5/357 | (2011.01) |

(Continued)

(52) U.S. Cl.
CPC ............. *H04N 9/09* (2013.01); *H04N 5/2173* (2013.01); *H04N 5/2258* (2013.01); *H04N 5/2355* (2013.01); *H04N 5/23232* (2013.01); *H04N 5/3572* (2013.01); *H04N 7/013* (2013.01); *H04N 9/045* (2013.01); *G06T 1/20* (2013.01)

(58) Field of Classification Search
CPC ..................................................... H04N 5/2351
USPC ....................................... 348/222.1, 235–239
See application file for complete search history.

(56) References Cited

U.S. PATENT DOCUMENTS

| 5,978,023 A | * | 11/1999 | Glenn ........................... 348/234 |
| 6,192,079 B1 | | 2/2001 | Sharma et al. |
| 7,408,986 B2 | | 8/2008 | Winder |

(Continued)

FOREIGN PATENT DOCUMENTS

| CN | 1965589 A | 5/2007 |
| CN | 101601306 A | 12/2009 |

(Continued)

OTHER PUBLICATIONS

"Kodak High Sensitivity Image Sensor Tech", Digital Photography Review, Retrieved on Jul. 9, 2014, Webpage available at : http://www.dpreview.com/articles/8732455081/kodakhighsens.

(Continued)

*Primary Examiner* — Tuan Ho
(74) *Attorney, Agent, or Firm* — Harrington & Smith

(57) ABSTRACT

In accordance with an example embodiment a method, apparatus and computer program product are provided. The method comprises receiving a first set of frames corresponding to a scene captured by a color image sensor and a second set of frames corresponding to the scene captured by a panchromatic image sensor. A number of frames in the second set is greater than a number of frames in the first set. The method further comprises generating color frames corresponding to the scene at a frame rate higher than a frame rate of the first set of frames based at least in part on processing of the first set of frames and the second set of frames.

20 Claims, 9 Drawing Sheets

(51) Int. Cl.
*H04N 9/04* (2006.01)
*G06T 1/20* (2006.01)

(56) References Cited

U.S. PATENT DOCUMENTS

| | | |
|---|---|---|
| 7,667,762 B2 | 2/2010 | Jenkins |
| 2007/0247517 A1 | 10/2007 | Zhang et al. |
| 2008/0198264 A1 | 8/2008 | Balram |
| 2008/0253455 A1 | 10/2008 | Van Zon et al. |
| 2009/0219432 A1 | 9/2009 | Palum et al. |
| 2009/0279790 A1 | 11/2009 | Burge et al. |
| 2010/0013948 A1 | 1/2010 | Azuma et al. |
| 2010/0045809 A1 | 2/2010 | Packard |
| 2010/0073499 A1 | 3/2010 | Gere |
| 2010/0201831 A1 | 8/2010 | Weinstein |
| 2010/0226570 A1 | 9/2010 | Riley et al. |
| 2010/0302418 A1 | 12/2010 | Adams, Jr. et al. |
| 2010/0309347 A1 | 12/2010 | Adams, Jr. et al. |
| 2010/0309350 A1 | 12/2010 | Adams, Jr. et al. |
| 2011/0018974 A1 | 1/2011 | Wang |
| 2011/0043665 A1 | 2/2011 | Ogasahara |
| 2011/0074992 A1 | 3/2011 | Ajito et al. |
| 2011/0090378 A1 | 4/2011 | Wang et al. |
| 2011/0234894 A1 | 9/2011 | Van Eggelen et al. |
| 2012/0057029 A1 | 3/2012 | Border et al. |

FOREIGN PATENT DOCUMENTS

| | | |
|---|---|---|
| CN | 102165783 A | 8/2011 |
| GB | 2175768 A | 12/1986 |
| WO | 98/16068 A1 | 4/1998 |
| WO | WO-9816068 A1 | 4/1998 |
| WO | 2008/069920 A1 | 6/2008 |
| WO | 2011/083669 A1 | 7/2011 |

OTHER PUBLICATIONS

Wilburn et al., "High-Speed Videography Using a Dense Camera Array", Proceedings of the IEEE Computer Society Conference on Computer Vision and Pattern Recognition, vol. 2, Jun. 27-Jul. 2, 2004, 8 pages.

"Kodak CCD Image Sensors Increase Light Sensitivity", DC Views, Retrieved on May 16, 2014, Webpage available at : http://www.dcviews.com/press/kodak-ccd.htm.

International Search Report and Written Opinion received for corresponding Patent Cooperation Treaty Application No. PCT/FI2012/051135, dated Jun. 4, 2013, 16 pages.

Extended European Search Report received for corresponding European Patent Application No. 13172379.3, dated Jul. 8, 2014, 6 pages.

"Charge-coupled Device (CCD) Image Sensors", High-Tech Digital, Retrieved on Oct. 18, 2011, Webpage available at :http://www.high-techdigital.com/integration/Camera_t_1.htm.

* cited by examiner

METHOD, APPARATUS AND COMPUTER PROGRAM PRODUCT FOR CAPTURING VIDEO CONTENT

TECHNICAL FIELD

Various implementations relate generally to method, apparatus, and computer program product for capturing video content.

BACKGROUND

Media capture devices, such as cameras, are configured to capture scenes unfolding in surrounding environment to generate multimedia content, such as video content. The generated video content comprises a plurality of still images or frames, which are displayed in a streaming manner to create the illusion of continuity associated with moving content. A frame rate refers to a rate of display of frames (e.g., consecutive frames) to create the illusion of continuity and is measured in units of frames per second. One of the factors determining the frame rate is an exposure time, which refers to duration for which light reaches an image sensor, for each frame. When the illumination is not satisfactory, a longer exposure time may be required to generate video content with clearer details and a reduced noise component. A higher exposure time (e.g., higher duration of time of exposure for each frame) results in a lower frame rate. If the frame rate is low, then the displayed video content may appear jerky and discontinuous.

SUMMARY OF SOME EMBODIMENTS

Various aspects of example embodiments are set out in the claims.

In a first aspect, there is provided a method comprising: receiving a first set of frames corresponding to a scene captured by a color image sensor; receiving a second set of frames corresponding to the scene captured by a panchromatic image sensor, wherein a number of frames in the second set is greater than a number of frames in the first set; and generating color frames corresponding to the scene at a frame rate higher than a frame rate of the first set of frames based at least in part on processing of the first set of frames and the second set of frames.

In a second aspect, there is provided a method comprising: receiving a first set of frames corresponding to a scene captured by color sensor pixels associated with an image sensor; receiving a second set of frames corresponding to the scene captured by panchromatic sensor pixels associated with the image sensor, wherein a number of frames in the second set is greater than a number of frames in the first set; and generating color frames corresponding to the scene at a frame rate higher than a frame rate of the first set of frames based at least in part on processing of the first set of frames and the second set of frames.

In a third aspect, there is provided an apparatus comprising at least one processor; and at least one memory comprising computer program code, the at least one memory and the computer program code configured to, with the at least one processor, cause the apparatus to at least perform: receive a first set of frames corresponding to a scene captured by a color image sensor; receive a second set of frames corresponding to the scene captured by a panchromatic image sensor, wherein a number of frames in the second set is greater than a number of frames in the first set; and generate color frames corresponding to the scene at a frame rate higher than a frame rate of the first set of frames based at least in part on processing of the first set of frames and the second set of frames.

In a fourth aspect, there is provided an apparatus comprising at least one processor; and at least one memory comprising computer program code, the at least one memory and the computer program code configured to, with the at least one processor, cause the apparatus to at least perform: receive a first set of frames corresponding to a scene captured by color sensor pixels associated with an image sensor; receive a second set of frames corresponding to the scene captured by panchromatic sensor pixels associated with the image sensor, wherein a number of frames in the second set is greater than a number of frames in the first set; and generate color frames corresponding to the scene at a frame rate higher than a frame rate of the first set of frames based at least in part on processing of the first set of frames and the second set of frames.

In a fifth aspect, there is provided a computer program product comprising at least one computer-readable storage medium, the computer-readable storage medium comprising a set of instructions, which, when executed by one or more processors, cause an apparatus to at least perform: receive a first set of frames corresponding to a scene captured by a color image sensor; receive a second set of frames corresponding to the scene captured by a panchromatic image sensor, wherein a number of frames in the second set is greater than a number of frames in the first set; and generate color frames corresponding to the scene at a frame rate higher than a frame rate of the first set of frames based at least in part on processing of the first set of frames and the second set of frames.

In a sixth aspect, there is provided a computer program product comprising at least one computer-readable storage medium, the computer-readable storage medium comprising a set of instructions, which, when executed by one or more processors, cause an apparatus to at least perform: receive a first set of frames corresponding to a scene captured by color sensor pixels associated with an image sensor; receive a second set of frames corresponding to the scene captured by panchromatic sensor pixels associated with the image sensor, wherein a number of frames in the second set is greater than a number of frames in the first set; and generate color frames corresponding to the scene at a frame rate higher than a frame rate of the first set of frames based at least in part on processing the first set of frames and the second set of frames.

In a seventh aspect, there is provided an apparatus comprising: means for receiving a first set of frames corresponding to a scene captured by a color image sensor; means for receiving a second set of frames corresponding to the scene captured by a panchromatic image sensor, wherein a number of frames in the second set is greater than a number of frames in the first set; and means for generating color frames corresponding to the scene at a frame rate higher than a frame rate of the first set of frames based at least in part on processing of the first set of frames and the second set of frames.

In an eighth aspect, there is provided an apparatus comprising: means for receiving a first set of frames corresponding to a scene captured by color sensor pixels associated with an image sensor; means for receiving a second set of frames corresponding to the scene captured by panchromatic sensor pixels associated with the image sensor, wherein a number of frames in the second set is greater than a number of frames in the first set; and means for generating color frames corresponding to the scene at a frame rate higher than a frame rate of the first set of frames based at least in part on processing of the first set of frames and the second set of frames.

In a ninth aspect, there is provided a computer program comprising program instructions which when executed by an apparatus, cause the apparatus to: receive a first set of frames corresponding to a scene captured by a color image sensor; receive a second set of frames corresponding to the scene captured by a panchromatic image sensor, wherein a number of frames in the second set is greater than a number of frames in the first set; and generate color frames corresponding to the scene at a frame rate higher than a frame rate of the first set of frames based at least in part on processing the first set of frames and the second set of frames.

In a tenth aspect, there is provided a computer program comprising program instructions which when executed by an apparatus, cause the apparatus to: receive a first set of frames corresponding to a scene captured by color sensor pixels associated with an image sensor; receive a second set of frames corresponding to the scene captured by panchromatic sensor pixels associated with the image sensor, wherein a number of frames in the second set is greater than a number of frames in the first set; and generate color frames corresponding to the scene at a frame rate higher than a frame rate of the first set of frames based at least in part on processing the first set of frames and the second set of frames.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
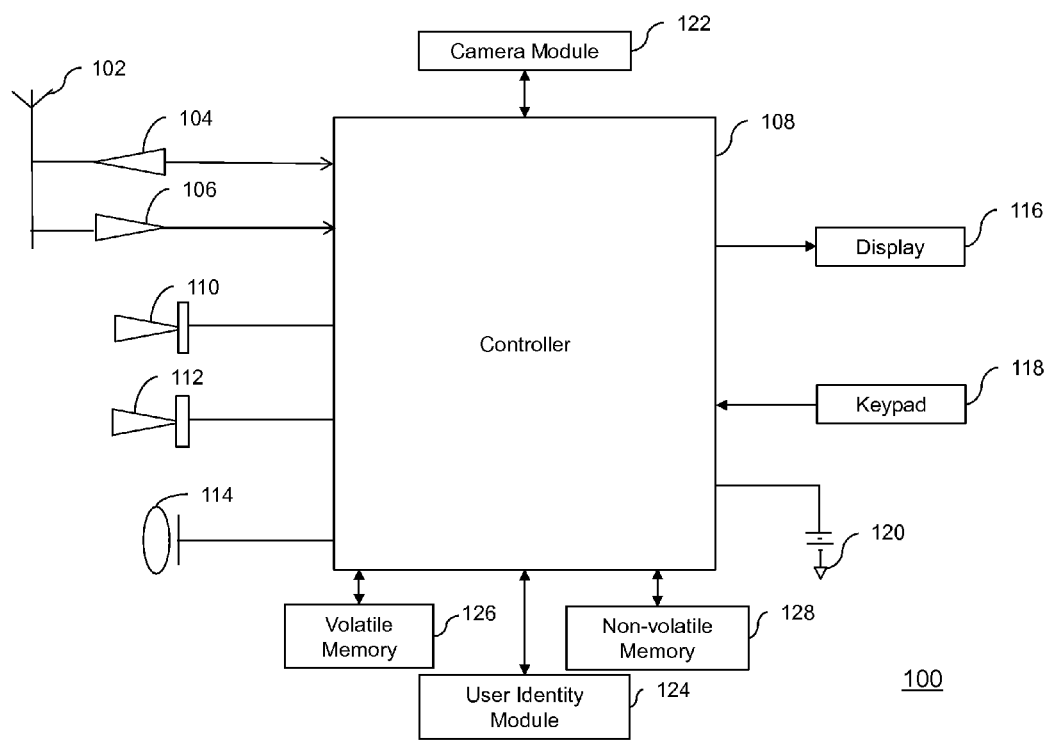
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment, the media capturing element is a camera module 122 which may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. In an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2A:
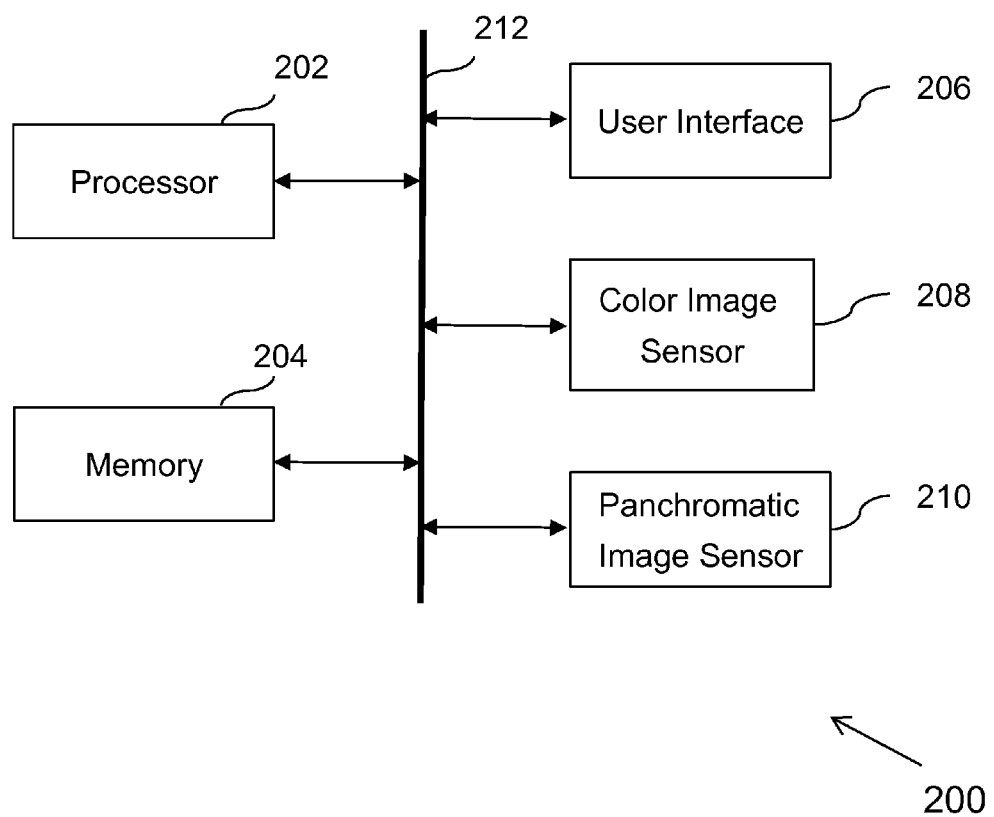
FIG. 2A illustrates an apparatus for capturing video content in accordance with an example embodiment.

FIG. 2A illustrates an apparatus 200 for capturing video content in accordance with an example embodiment. The apparatus 200 for capturing the video content may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices). Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising multimedia content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive multimedia content. Examples of multimedia content may include audio content, video content, data, and a combination thereof.

In an example embodiment, the electronic device and/or the media capturing device may be embodied as to include color image sensors, such as a color image sensor 208. The color image sensor 208 may be in communication with the processor 202 and/or other components of the apparatus 200. The color image sensor 208 may be in communication with other imaging circuitries and/or software, and is configured to capture digital images or to make a video or other graphic media files. The color image sensor 208 and other circuitries, in combination, may be an example of the camera module 122 of the device 100. In an example embodiment, color image sensor 208 may be an image sensor on which a color filter array (CFA) is disposed. Image sensors constructed using semiconductor materials such as CMOS based sensors, or charged coupled devices (CCD) sensors are not color or wavelength sensitive, and therefore the CFA is disposed over the color image sensors, such as the color image sensor 208. In an example embodiment, the CFA includes color sensor pixels, such as those for colors red, green and blue (RGB), disposed in a mosaic pattern over the color image sensor 208 for sampling respective colors corresponding to the captured scene. The sampled values obtained from these color sensor pixels, after interpolation, configure image pixels. Since each image pixel is filtered to record only one of three colors, the data from each pixel cannot fully determine color on its own. To obtain a full-color image, various demosaicing algorithms may be employed to interpolate a set of complete red, green, and blue values for each image pixel corresponding to a captured frame.

In an example embodiment, the color image sensor 208 may include a Bayer CFA configured to provide one of RGB and cyan, magenta, and yellow (CMY) color patterns. In an embodiment, the Bayer CFA may include twice as many green image pixels as red or blue to mimic the physiology of the human eye, which is more sensitive to green light as compared to red light and blue light. Accordingly, the color pattern may be 50% green, 25% red and 25% blue, and may also be called as RGBG, GRGB, or RGGB color pattern.

In an example embodiment, the electronic device and/or the media capturing device may be embodied as to include a panchromatic image sensor, such as a panchromatic image sensor 210. The panchromatic image sensor 210 may be in communication with the processor 202 and/or other components of the apparatus 200. The panchromatic image sensor 210 may be in communication with other imaging circuitries and/or software, and is configured to capture digital images or to make a video or other graphic media files. The panchromatic image sensor 210 and other circuitries, in combination, may be an example of the camera module 122 of the device 100. In an example embodiment, the panchromatic image sensor 210 may include or may be associated with panchromatic sensor pixels. In an example embodiment, a CFA (for example, a panchromatic filter) including panchromatic sensor pixels may be disposed over the panchromatic image sensor 210. In an example embodiment, sensitivity to incident light corresponding to the captured scene of the panchromatic image sensor 210 is greater than or equal to twice the sensitivity of the color image sensor 208. More specifically, the panchromatic sensor pixels associated with the panchromatic image sensor 210 have sensitivity to incident light which is greater than or equal to twice the sensitivity of the color sensor pixels associated with the color image sensor 208. As a result of greater sensitivity, for a given scene illumination, the panchromatic image sensor 210 may be capable of capturing at least twice the number of frames than a number of frames captured by the color image sensor 208. Alternatively, the panchromatic image sensor 210 may capture the same number of frames as that captured by the color image sensor 208 in nearly half the exposure time configured for the color image sensor 208.

These components (202-210) may communicate with each other via a centralized circuit system 212 for capturing of video content. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the processor 202 is configured to, with the content of the memory 204, and optionally with other components described herein, to cause the apparatus 200 to capture video content. In an embodiment, the video content may comprise a plurality of video frames, for example, a sequence of video frames. The sequence of video frames may correspond to a single scene of the video content. In an embodiment, the plurality of video frames may correspond to video content captured by the image sensors, such as the color image sensor 208 and the panchromatic image sensor 210. It is noted that the terms 'video frames' and 'frames' are used interchangeably herein and refer to the same entity.

In an example embodiment, the processor 202 is configured to, with the content of the memory 204, and optionally with other components described herein, to cause the apparatus 200 to receive a first set of frames corresponding to a scene. The scene may include one or more objects in a surrounding environment of the apparatus 200, for example, a person or a gathering of individuals, birds, books, a playground, natural scenery, such as a mountain, and the like, which may be captured by image sensors, such as the color image sensor 208 and the panchromatic image sensor 210. In an example embodiment, the first set of frames is captured by a color image sensor, such as the color image sensor 208 of the apparatus 200. In certain example embodiments, the color image sensor 208 may be external to the apparatus 200, but accessible and/or controlled by the apparatus 200. In an example embodiment, the apparatus 200 is caused to receive image samples from the color image sensor 208, and perform demosaicing of the image samples to generate the first set of frames. In certain example embodiments, other techniques may also be utilized to generate the first set of frames from incomplete image samples received from the color image sensor 208. In an example embodiment, the first set of frames comprises chrominance information (for example, primary color information, such as an RGB information) corresponding to the captured scene. In an example embodiment, a processing means may be configured to receive the first set of frames corresponding to a scene captured by the color image sensor 208. An example of the processing means may include the processor 202, which may be an example of the controller 108.

In an example embodiment, the processor 202 is configured to, with the content of the memory 204, and optionally with other components described herein, to cause the apparatus 200 to receive a second set of frames corresponding to the scene. In an example embodiment, the second set of frames is captured by a panchromatic image sensor, such as the panchromatic image sensor 210 of the apparatus 200. It is noted that the panchromatic image sensor 210 and the color image sensor 208 capture frames corresponding to the scene simultaneously. The first set of frames and the second set of frames are captured simultaneously and correspond to the same scene. In an example embodiment, the captured first set of frames and the second set of frames are received either simultaneously or near simultaneously. In certain example embodiments, the panchromatic image sensor 210 may be external, but accessible and/or controlled by the apparatus 200. In an example embodiment, the apparatus 200 is caused to receive image samples from the panchromatic image sensor 210, and perform demosaicing of the image samples to generate the second set of frames. In an example embodiment, the second set of frames comprises luminance information (e.g., gray scale information) corresponding to the captured scene. In an example embodiment, a processing means may be configured to receive the second set of frames corresponding to a scene captured by the panchromatic image sensor 210. An example of the processing means may include the processor 202, which may be an example of the controller 108.

In an example embodiment, sensitivity to incident light corresponding to the captured scene of the panchromatic image sensor 210 is greater than or equal to twice the sensitivity of the color image sensor 208. As explained above, the panchromatic image sensor 210 may include or may be associated with panchromatic sensor pixels, which have higher sensitivity (for example, greater than or equal to twice the sensitivity of the color sensor pixels associated with the color image sensor 208) to incident light corresponding to a captured scene. In an example embodiment, the panchromatic sensor pixels are approximately three times more sensitive to light than the color sensor pixels. This implies that if the color image sensor 208 is capable of achieving a signal level 'X' in exposure time 'T' with gain 'G', then the panchromatic image sensor 210 may achieve a similar signal level in time 'T/3' (approximately) with same gain. Alternately, the panchromatic image sensor 210 may achieve a signal level of almost 3X in exposure time T with gain G. This property of the panchromatic image sensor 210 is useful in two ways, such as in improving signal to noise ratio (especially in low light) and in achieving extremely fast exposures resulting in higher output in number of frames. For example, based on an illumination prevalent in the environmental conditions, an exposure time may be determined by an algorithm (for example, a computer program stored in the memory 204) and accordingly light rays from scenes unfolding in surrounding environment may be incident on the color image sensors 208 and the panchromatic image sensor 210 based on the determined exposure time. For the same scene and for the same exposure time, if the color image sensor captures 'X' number of frames, then the panchromatic image sensor 210 may capture at least '2X' number of frames on account of higher sensitivity to incident light of panchromatic image pixels associated with the panchromatic image sensor 210. Accordingly, a number of frames in the second set is greater than a number of frames in the first set.

In an example embodiment, the processor 202 is configured to, with the content of the memory 204, and optionally with other components described herein, to cause the apparatus 200 to generate color frames corresponding to the scene at a frame rate higher than a frame rate of the first set of frames based at least in part on processing of the first set of frames and the second set of frames. In an example embodiment, the processing of the first set of frames and the second set of frames comprises combining the chrominance information and the luminance information for generating the color frames corresponding to the captured scene. The combining of the chrominance information and the luminance information for generating the color frames may be achieved by employing various fusion techniques. In an example embodiment, if a frame rate (for example, number of frames captured per second) associated with the first set of frames is 30 frames per second (fps) then the color frames are configured to be generated at a frame rate that is greater than 30 fps. In an example embodiment, a processing means may be configured to generate color frames corresponding to the scene at a frame rate higher than a frame rate of the first set of frames based at least in part on processing the first set of frames and the second set of frames. An example of the processing means may include the processor 202, which may be an example of the controller 108.

In an example embodiment, the processor 202 is configured to, with the content of the memory 204, and optionally with other components described herein, to cause the apparatus 200 to align the second set of frames based on the first set of frames prior to generating the color frames. Alternatively, in an example embodiment, the first set of frames is aligned based on the second set of frames prior to generating the color frames. The alignment, for example warping, may be performed in order to obtain the output of one image sensor, such as the panchromatic image sensor 210 in view of the second image sensor, such as the color image sensor 208. This may be done as the two image sensors, even though capturing the same scene may capture the information with slight difference on account of difference in an angle of capture. Accordingly, alignment of pixels may be performed to obtain the view of one image sensor in terms of other image sensor. Accordingly, a warp may be computed to obtain the output of panchromatic image sensor 210 in the view of the color image sensor 208. The alignment of the frames is explained herein with respect to obtaining the output of panchromatic image sensor 210 in the view of the color image sensor 208, however, it is noted that alternatively the warp may be computed to obtain the output of color image sensor 208 in the view of the panchromatic image sensor 210. In some embodiments, it may be preferable to compute the warp for obtaining the output of the color image sensor 208 in the view of the panchromatic image sensor 210. Warping in such a manner may preclude a loss in 'sharpness' (for example, quality of the image) of the generated color frame. In some embodiments, warping may involve performing interpolation (for example, bilinear interpolation), which may affect a sharpness associated with a frame. If a frame from the first set is warped, or more specifically, a chrominance information associated with the frame in the first set is warped to luminance information from a frame in the second set, then a sharpness of the luminance information is retained while the loss of some sharpness in the chrominance information does not affect the sharpness of the generated color frame on account of the chrominance information being relatively low-pass compared to the luminance information. In an example embodiment, the warp may be computed as an 8 parameter transform (for example, using standard techniques, such as similarity, homography, affine and the like) or may be computed using a dense correspondence computed for a stereo camera.

In an example embodiment, exposure time (for example, duration for which light reaches an image sensor for each frame) associated with the color image sensor 208 and the panchromatic image sensor 210 is aligned, for example exposure instants for capturing the scene for the color image sensor 208 and the panchromatic image sensor 210 are matched. In an example embodiment, a frame at a timestamp in the second set is aligned to a frame at the corresponding timestamp in the first set. For example, the frame in the second set at a timestamp X, for example at the $10^{th}$ second, is aligned to a frame at the timestamp of $10^{th}$ second in the first set. Similarly, a frame in the second set at a timestamp Y is aligned to a frame at the timestamp Y in the first set. As explained above, a number of frames in the second set is greater than the number of frames in the first set on account of higher number of frames captured by panchromatic sensor pixels associated with the panchromatic image sensor 210. Accordingly, there may be frames in the second set which may not have any frames in the first set with matching timestamps. In an example embodiment, a frame at a timestamp in the second set is aligned to a frame in the first set at a timestamp preceding the timestamp of the frame in the second set, if the frame at the corresponding timestamp is absent in the first set. For example, if the frame in the second set is at a timestamp X, and there is no corresponding frame in the first set at the timestamp X, then the frame in the second set is aligned to a frame in the first set at a preceding timestamp, for example at a timestamp 'X−1'. At a high frame rate, the scene content usually may not change much and accordingly, a frame in the second set may be aligned to a frame in the first set at a previous timestamp. The alignment of frames when exposure times associated with the color image sensor 208 and the panchromatic image sensor 210 are aligned is explained in FIG. 4. The luminance information of the frame in the second set, post alignment, may combined with the chrominance information of the frame in the first set (at a matching timestamp or at a timestamp of a previous frame) for generating the color frames.

In an example embodiment, the processor 202 is configured to, with the content of the memory 204, and optionally with other components described herein, to cause the apparatus 200 to stagger exposure times associated with the color image sensor 208 and the panchromatic image sensor 210. In an example embodiment, timestamps corresponding to the frames in the first set are configured to fall between timestamps corresponding to the frames in the second set upon staggering of the exposure times associated with the color image sensor 208 and the panchromatic image sensor 210. In an example embodiment, timestamps for frames in the first set may fall between (for example, interleave) timestamps of frames in the second set. For example, upon staggering of exposure times associated with the color image sensor 208 and the panchromatic image sensor 210, if timestamps corresponding to an intermediate sequence of frames in the second set in seconds is 10, 12, 14, 16, 18, 20, 22, 24 and so on and so forth, then the timestamps corresponding to the frames in the first set in seconds may be 11, 17, 23 and the like, i.e. with timestamps falling between the timestamps corresponding to the frames in the first set.

In an example embodiment, a frame at a timestamp in the second set is aligned to at least one frame in the first set at a preceding timestamp and a succeeding timestamp of the timestamp of the frame in the second set. For example, in the above example, a frame in the second set at a timestamp of $16^{th}$ second may be aligned to frame in the first set at timestamp of 11$^{th}$ second, i.e. preceding timestamp, and, a frame in the first set at timestamp of 17$^{th}$ second, i.e. succeeding timestamp. On account of such interleaving of timestamps, one or more frames in the second set may be aligned to more than one frame in the first set as the scene content in close-by frames may not change much. Accordingly, a frame rate of the generated color frames is high, for example, even higher than the frame rate for generated color frames with aligned exposure times for the color image sensor 208 and the panchromatic image sensor 210. The alignment and the generation of color frames in such a scenario are further explained in FIGS. 5A and 5B. In an example embodiment, a processing means may be configured to stagger exposure times associated with the color image sensor 208 and the panchromatic image sensor 210. An example of the processing means may include the processor 202, which may be an example of the controller 108.

In an example embodiment, for alignment purposes, a warp matrix may be determined based on feature points associated with a frame in the second set and feature points associated with a frame in the first set. Examples of the feature points may include, but are not limited to, corners, edges of an image, or other region of interest such as background of the scene. In an example embodiment, the apparatus 200 is caused to perform a gray scale conversion of a frame in the first set to generate the gray scale image, and to determine the feature points associated with the gray scale image. In an example embodiment, the apparatus 200 may be caused to use algorithms such as scale-invariant feature transform (SIFT), Harris corner detector, smallest univalue segment assimilating nucleus (SUSAN) corner detector, features from accelerated segment test (FAST) for determining feature points associated with the gray scale image and the frame in the second set. In an example embodiment, the apparatus 200 is caused to determine correspondence information between the feature points associated with the gray scale image corresponding to the frame in the first set and the feature points associated with the frame in the second set. In an example embodiment, the apparatus 200 is caused to determine the correspondence information using algorithms such as random sample consensus (RANSAC). In an example embodiment, the apparatus 200 is caused to compute the warp matrix based on the correspondence information. In an example embodiment, a frame in the second set may be warped corresponding to the frame in the first set using the warp matrix.

In an example embodiment, chrominance information associated with a frame in the first set may be computed. In an example embodiment, the apparatus 200 is caused to determine the chrominance information of the frame in the first set by decomposing the frame into a luminance-chrominance format. In an example embodiment, the chrominance information of the frame in the first set (for example, the RGB image) may be denoised to generate smooth chrominance information. In an example embodiment, the luminance information corresponding to a frame in the second set may be warped corresponding to the denoised chrominance information using the warp matrix.

In an example embodiment, the processor 202 is configured to, with the content of the memory 204, and optionally with other components described herein, to cause the apparatus 200 to perform at least one of deblurring of the frames of the first set and increasing a brightness associated with the frames of the first set prior to aligning the frames of the first set and the second set. In an example embodiment, a brightness associated with the frames of the first set is lesser than that of the frames in the second set for a given set of capture parameters. In an example embodiment, the brightness associated with the frames of the first set is significantly lesser than that of the frames in the second set for a given set of capture parameters. In an example embodiment, if the brightness associated with the frames of the first set is significantly lesser than that of the frames in the second set for a given set of capture parameters, then the brightness associated with the frames of the first set may be increased by using a gain (for example, by using an amplifier during image capture or computationally after image capture) to preclude a de-saturation of color in generated color frames as a perception of color and color saturation is dependent upon the corresponding luminance level. In an example embodiment, the gain may either be applied based on pre-determined manual and/or automatic configurations or alternatively may be applied based on relative brightness of the frames in the first set and the frames in the second set. In such a case where a gain needs to be applied to the frames of the first set to preclude the loss of color information, an increase in noise component with the corresponding increase in gain is observed. To alleviate the increase in the noise component, a denoising algorithm may be applied on the frames of the first set or selectively to the chrominance information (before or after alignment) by using various techniques. Examples of such techniques may include but are not limited to a sigma filter, a bilateral filter and wavelet based methods.

In some exemplary scenarios, the frames corresponding to the scene may be captured in less than ideal conditions. For example, the captured scene may include moving visuals or the apparatus 200 may not be steady while capturing the frames corresponding to the scene or both. In such scenarios, the captured frames may include blurring of content, which may produce a distorting effect on the details included in the frames. The blurring effect may especially affect the frames in the first set as an exposure time associated with the color image sensor 208 may be higher than the exposure time associated with the panchromatic image sensor 210. In an example embodiment, deblurring algorithms may be employed for deblurring (for example, correcting the frames from the blurring effect) before warping the chrominance information and determining the dense correspondence with respect to the luminance information included in the second set of frames. In an embodiment, the deblurring algorithms may involve computing a blur kernel for deblurring the chrominance information. In an example embodiment, the blur kernel may be computed either in a blind manner or using the unblurred frames from the second set. In an example embodiment, such deblurring may reduce the motion blur in the frames of the first set and improve the subjective quality of the generated color frames. In an example embodiment, a processing means may be configured to perform at least one of deblurring of the frames of the first set and increasing a brightness associated with the frames of the first set prior to aligning the frames of the first set and the second set. An example of the processing means may include the processor 202, which may be an example of the controller 108.

In an example embodiment, the apparatus 200 is configured to combine the warped luminance information of the frame in the second set and the chrominance information of the frame in the first set to generate a color frame. Alternatively, warped chrominance information of the frame in the first set may be combined with the luminance information of the frame in the second set to generate a color frame. In an example embodiment, the generated color frames are improved frames in terms of quality from frames individually received from the panchromatic image sensor 210 and the color image sensor 208. For instance, a color frame is a color image generated from processing the warped luminance information of the panchromatic image sensor 210 and the chrominance information, which in turn, provides the color frames with a higher SNR than the image frame (RGB) received from the color image sensor 208. In an example embodiment, the color frames may have a better quality than the frames otherwise captured by the panchromatic image sensor 210 and the color image sensor 208, as it is generated based on the luminance of the frames in the second set (which are more sensitive to light) and color component (for example, the chrominance information) of the frames in the first set.

In an example embodiment, the color frames corresponding to the scene are generated at a frame rate higher than a frame rate of the first set of frames. As explained, the number of frames in the second set is higher than a number of frames in the first set. The higher number of frames in the second set is aligned to the frames in the first set and subsequent to alignment, the luminance information and the chrominance information is combined to generate a higher number of color frames. In an example embodiment, if a scene lighting is such that the exposure time required for the color image sensor 208 is 33 ms (implying that a frame rate for the color image sensor is 1000/33=~30 fps), then the exposure time required for the panchromatic image sensor 210 will be less than or equal to 16 ms to obtain approximately similar brightness. As a result, combining the two image sensor outputs (for example, combining the luminance and the chrominance information) results in a video sequence that has an average exposure time of less than or equal to 16 ms, implying that a frame rate for the color frames has doubled to ~60 frames per second. In low light conditions, if the scene lighting is such that only 15 fps is possible for the color image sensor 208, then the exposure time will be 66.67 ms (for example, 1000/15 ms). In this case, the exposure time for panchromatic image sensor 210 will be less than or equal to 33 ms. As a result, the frame rate obtained will be effectively as per 33 ms exposure, which corresponds to 30 fps for the color frames. Thus, irrespective of scene lighting conditions, a frame rate of the generated color frames is higher than the frame rate associated with the color image sensor 208. The generation of color frames at higher frame rate is further explained in FIGS. 4, 5A and 5B.

In an example embodiment, the apparatus 200 may preclude the color image sensor 208 and the panchromatic image sensor 210 and instead include a single image sensor, which is associated with color sensor pixels and panchromatic sensor pixels for capturing video content. Such an image sensor may be configured with pixel specific exposure control and/or separate exposure control for panchromatic sensor pixels and color sensor pixels. Such an apparatus is explained in FIG. 2B.

Figure 2B:
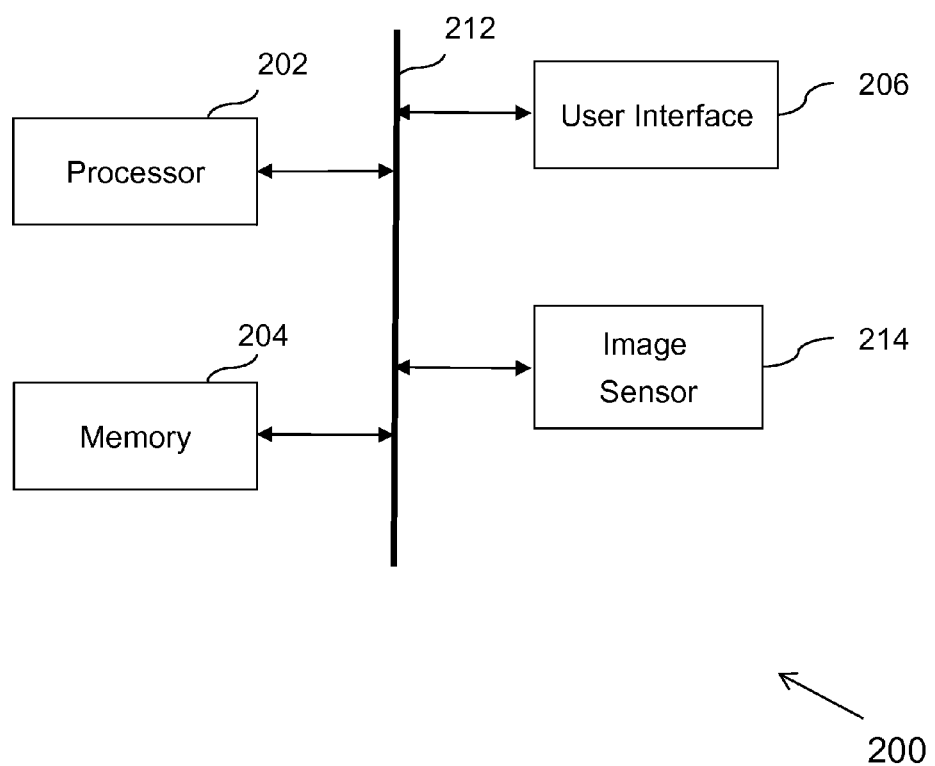
FIG. 2B illustrates an apparatus for capturing video content in accordance with another example embodiment.

FIG. 2B illustrates an apparatus 200 for capturing video content in accordance with another example embodiment. The apparatus 200 of FIG. 2B precludes the color image sensor 208 and the panchromatic image sensor 210 of FIG. 2A and is depicted to include an image sensor 214 in addition to the processor 202, the memory 204, the user interface 206 and the centralized circuit system 212. The various components of the apparatus 200 of FIG. 2B, such as the processor 202, the memory 204, the user interface 206 and the centralized circuit system 212 perform similar functions as explained in FIG. 2A and are not explained herein. In an example embodiment, a color filter array (CFA) may be disposed over the image sensor 214. As explained in FIG. 2A, an image sensor constructed using semiconductor materials such as CMOS based sensor, or charged coupled devices (CCD) sensor is not color or wavelength sensitive, and therefore in such image sensors, a CFA is disposed over the image sensor. In an example embodiment, the CFA associated with the image sensor 214 may include color sensor pixels and panchromatic sensor pixels. In an example embodiment, the CFA may include a RGBW color filter pattern. More specifically, CFA may include color sensor pixels such as those for red, green and blue (RGB) colors in addition to the panchromatic sensor pixels (also referred as a White pixels or W). The color sensor pixels and the panchromatic sensor pixels may be disposed in a mosaic pattern (for example, RGBW color filter pattern) over the image sensor 214 for sampling respective chrominance-luminance information corresponding to the captured scene. In certain example embodiments, the image sensor 214 may be external to the apparatus 200, but accessible and/or controlled by the apparatus 200.

In an example embodiment, the processor 202 is configured to, with the content of the memory 204, and optionally with other components described herein, to cause the apparatus 200 to receive a first set of frames (for example, the first set of frames as explained in FIG. 2A) corresponding to a scene captured by color sensor pixels associated with the image sensor 214. In an example embodiment, the apparatus 200 is caused to receive image samples from the color sensor pixels, and perform demosaicing of the image samples to generate the first set of frames. In an example embodiment, the first set of frames comprises chrominance information (e.g., primary color information, such as an RGB information) corresponding to the captured scene. In an example embodiment, a processing means may be configured 200 to receive the first set of frames corresponding to a scene captured by color sensor pixels associated with the image sensor 214. An example of the processing means may include the processor 202, which may be an example of the controller 108.

In an example embodiment, the processor 202 is configured to, with the content of the memory 204, and optionally with other components described herein, to cause the apparatus 200 to receive a second set of frames corresponding to the scene captured by the panchromatic sensor pixels associated with the image sensor 214. In an example embodiment, the second set of frames comprises luminance information (e.g., gray scale information) corresponding to the captured scene. The panchromatic sensor pixels have a higher sensitivity to incident light corresponding to the captured scene and its sensitivity is greater than or equal to twice the sensitivity of the color sensor pixels associated with the image sensor 214. In an example embodiment, the panchromatic sensor pixels may have a separate exposure control and independent read out (for example, sampling) mechanism. For example, the panchromatic sensor pixels may be read out two times for each RGB pixels sampling, and demosaicing may be performed to obtain a frame for the second set. On account of higher sensitivity to incident light of the panchromatic sensor pixels, a number of frames in the second set is greater than a number of frames in the first set. In an example embodiment, a processing means may be configured to receive the second set of frames corresponding to the scene captured by the panchromatic sensor pixels associated with the image sensor 214. An example of the processing means may include the processor 202, which may be an example of the controller 108.

In an example embodiment, the processor 202 is configured to, with the content of the memory 204, and optionally with other components described herein, to cause the apparatus 200 to generate color frames corresponding to the scene at a frame rate higher than a frame rate of the first set of frames based at least in part on processing of the first set of frames and the second set of frames. In an example embodiment, processing of the first set of frames and the second set of frames comprises combining the chrominance information and the luminance information of frames for generating the color frames corresponding to the captured scene. The combining of the chrominance information and the luminance information for generating the color frames may be achieved by employing various fusion techniques. In an example embodiment, if a frame rate associated with the first set of frames is 15 frames per second (fps) than the color frames are configured to be generated at a frame rate that is greater than 15 fps. In an example embodiment, the generation of the color frames may be performed based on the first set of frames and the second set of frames as explained in FIG. 2A. In an example embodiment, the generation of color frames may preclude alignment of second set of frames based on the first set of frames. In an example embodiment, a processing means may be configured to generate color frames corresponding to the scene at a frame rate higher than a frame rate of the first set of frames based at least in part on processing of the first set of frames and the second set of frames. An example of the processing means may include the processor 202, which may be an example of the controller 108. A simplified overview of generation of color frames is explained in FIG. 3.

Figure 3:
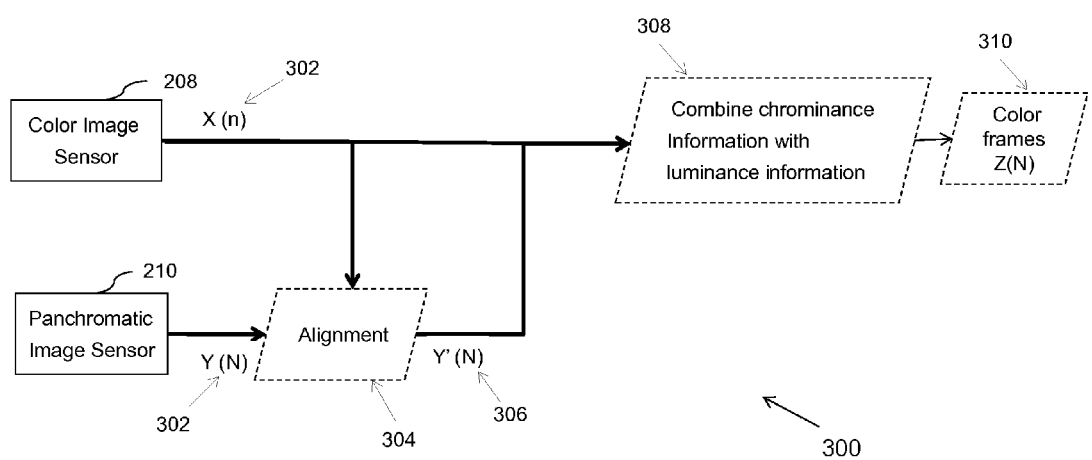
FIG. 3 illustrates a block diagram depicting a simplified overview of generation of color frames in accordance with an example embodiment.

FIG. 3 illustrates a block diagram 300 depicting a simplified overview of generation of color frames in accordance with an example embodiment. In an embodiment, the generation of color frames as illustrated by the block diagram 300 may be employed by the apparatus 200 of FIG. 2A. As explained in FIG. 2A, the color image sensor 208 and the panchromatic image sensor 210 may capture frames corresponding to a scene. The scene lighting conditions may dictate an exposure time for each of the color image sensor 208 and the panchromatic image sensor 210 for capturing the frames corresponding to the scene. At 302, the color image sensor 208 and the panchromatic image sensor 210 capture frames corresponding to the scene. In an example embodiment, the captured first set of frames and the second set of frames are received either simultaneously or near simultaneously. The first set of frames corresponding to the scene captured by the color image sensor 208 are denoted by X(n) and the second set of frames captured corresponding to the same scene by the panchromatic image sensor 210 are denoted by Y(N) in FIG. 3. It is noted that a number of frames in Y(N) is greater than a number of frames in X(n) of account of higher sensitivity to incident light of panchromatic sensor pixels associated with the panchromatic image sensor 210.

At 304, an alignment of the second set of frames is performed based on the first set of frames. As explained in FIG. 2A, alignment, for example warping, may be performed in order to obtain the output of one image sensor, such as the panchromatic image sensor 210 in view of the second image sensor, such as the color image sensor 208. This may be done as the two image sensors, even though capturing the same scene may capture the information with slight difference on account of difference in an angle of capture. Accordingly, alignment of pixels may be performed to obtain the view of one image sensor in terms of other image sensor. Accordingly, a warp may be computed to obtain the output of panchromatic image sensor 210 in the view of the color image sensor 208. The alignment of the second set of frames may be performed by computing featuring points and determining a warping matrix as explained in FIG. 2A. The alignment of the second set of frames is further explained in FIGS. 4, 5A and 5B. The aligned second set of frames (for example, the second set of frames with the warped luminance information) are denoted as Y'(N) at 306.

At 308, the warped luminance information from the aligned second set of frames Y'(N) is combined with the chrominance information from the first set of frames X(n). As explained in FIG. 2A, various fusion techniques may be utilized for combining the luminance information and the chrominance information. The combining of the warped luminance information from the aligned second set of frames Y'(N) with the chrominance information from the first set of frames X(n) results in generation of color frames Z(N) at 310. It is noted that a frame rate of the generated color frames Z(N) is higher than a frame rate of the first set of frames X(n). Since, a higher number of frames in the second set are aligned to the frames in the first set (either at matching timestamp or at a preceding timestamp) and subsequent to alignment, the luminance information and the chrominance information is combined, a higher number of color frames are generated implying a higher frame rate for the generated color frames. The alignment and generation of color frames is explained further in FIG. 4.

It is noted that the apparatus 200 of FIG. 2B precludes the inclusion of color image sensor 208 and the panchromatic image sensor 210 and instead utilizes an image sensor 214 associated with color sensor pixels and panchromatic sensor pixels. Accordingly, the generation of color frames as illustrated by the block diagram 300 may be employed by the apparatus 200 of FIG. 2B, where the first set of frames X(n) and the second set of frames Y(n) are received from the color sensor pixels and the panchromatic sensor pixels of the image sensor 214, respectively, and the chrominance information of X(n) is combined with the luminance information of Y(N), while precluding the need for alignment at 304, to generate the color frames Z(N).

Figure 4:
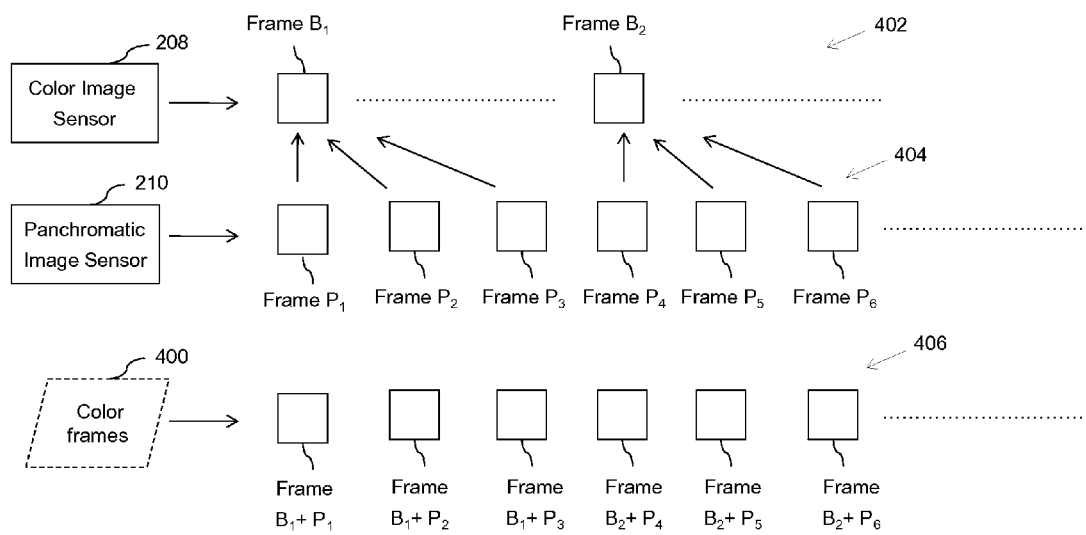
FIG. 4 illustrates alignment of frames in the second set based on the frames in the first set in accordance with an example embodiment.

FIG. 4 illustrates alignment of frames in the second set based on the frames in the first set in accordance with an example embodiment. In an embodiment, the alignment as depicted in FIG. 4 may be employed by the apparatus 200 of FIG. 2A prior to generation of color frames 400. In FIG. 4, it is assumed that exposure times associated with color image sensor 208 and the panchromatic image sensor 210 are configured to be aligned for capturing frames corresponding to a scene.

At 402, frames configuring the first set, such as frame $B_1$, frame $B_2$ and the like are received from the color image sensor 208. The frames configuring the second set, such as frame $P_1$, frame $P_2$, frame $P_3$, frame $P_4$, frame $P_5$ and frame $P_6$ and the like are received from the panchromatic image sensor 210 at 404. It is noted that the first set of frames and the second set of frames comprise a plurality of frames and frames such as frame $B_1$–$B_2$ and $P_1$–$P_6$ are depicted for illustration purposes. It is also noted that the frames configuring the first set and the frames configuring the second set correspond to the same scene, i.e., the frames are captured simultaneously and separately by the color image sensor 208 and the panchromatic image sensor 210. In an example embodiment, the captured first set of frames and the second set of frames are received either simultaneously or near simultaneously. As explained in FIG. 2A, panchromatic sensor pixels associated with the panchromatic image sensor 210 are at least twice as sensitive to incident light as the color sensor pixels associated with the color image sensor. Accordingly, a number of frames in the second set is greater than a number of frames in the first set. In FIG. 4, the panchromatic sensor pixels are assumed to be three times more sensitive to incident light than the color sensor pixels and accordingly the number of frames in the second set is depicted to be three times the number of frames in the first set.

It is noted that the panchromatic sensor pixels associated with the panchromatic image sensor 210 refers to a panchromatic filter which includes the panchromatic pixels and which is disposed over the panchromatic image sensor 210 for sampling luminance information. Similarly, the color sensor pixels associated with the color image sensor 208 refers to a color filter array, such as a Bayer CFA, which includes a mosaic of color filters (for example, RGB color filters) and which is disposed over the color image sensor 208 for sampling chrominance information. In an example embodiment, the frames in the second set comprise luminance information corresponding to the captured scene and the frames in the first set comprise chrominance information corresponding to the captured scene.

The frames in the second set are aligned to the frames in the first set in order to obtain the output of the panchromatic image sensor 210 in view of the color image sensor 208. As explained in FIG. 2A, a frame at a timestamp in the second set is aligned with a frame at the corresponding timestamp in the first set. In FIG. 4, the frame $P_1$ of the second set and frame $B_1$ of the first set are captured at the same time instant, i.e. their corresponding timestamp matches. The frame $P_1$ may be aligned to the frame $B_1$ with the matching timestamp. In an example embodiment, the feature points may be computed for frames $P_1$ and $B_1$ and correspondence information identified between the computed feature points. A warp matrix may be determined based on the correspondence information and the frame $P_1$ may be aligned to frame $B_1$ based on warp matrix. In an example embodiment, luminance information corresponding to the frame $P_1$ may be warped to a gray-scale image configured from the chrominance information corresponding to the frame $B_1$ based on the warp matrix for aligning the frame $P_1$ to the frame $B_1$. Similarly, the frame $P_4$ is aligned based on the frame $B_2$ (for example, a frame in the first set with matching timestamp).

Further, as explained in FIG. 2A, a frame at a timestamp in the second set is aligned to a frame in the first set at a timestamp preceding the timestamp of the frame in the second set, if the frame at the corresponding timestamp is absent in the first set. At a high frame rate, the scene content usually may not change much and accordingly, a frame in the second set may be aligned to a frame in the first set at a previous timestamp. In FIG. 4, the frames $P_2$ and $P_3$ of the second set do not have frames in the first set with corresponding, for example matching, timestamps. Each of the frames $P_2$ and $P_3$ is aligned to a frame in the first set with a preceding timestamp, for example frame $B_1$. The alignment may be performed in a manner similar to the alignment of frames $P_1$ and $B_1$. Similarly, the frames $P_5$ and $P_6$ of the second set do not have frames in the first set with matching timestamps. Accordingly, each of the frames $P_5$ and $P_8$ is aligned to a frame in the first set with a preceding timestamp, for example frame $B_2$.

The luminance information of the frame in the second set, post alignment, may combined with the chrominance information of the frame in the first set (at a matching timestamp or at a timestamp of a previous frame) for generating the color frames 400 at 406. For example, on aligning frames $P_1$ and $B_1$, the warped luminance information corresponding to the frame $P_1$ may be combined with chrominance information of frame $B_1$ to generate a color frame $B_1+P_1$. Similarly, on aligning frames $P_2$ and $B_1$, the warped luminance information corresponding to the frame $P_2$ may be combined with chrominance information of frame $B_1$ to generate a color frame $B_1+P_2$. The remaining frames in the second set may similarly be aligned and combined with frames in the first set to generate the color frames 400. As can be seen in FIG. 4, the frame rate of the color frames 400 is higher than the frame rate of first set of frames. The higher frame rate may especially be useful when viewing video content corresponding to the captured scene on extremely large displays, as the video will appear smoother and precluding jerks and discontinuities. Moreover, a quality of the generated color frames 400 is also better than the frames captured by either of the color image sensor 208 or the panchromatic image sensor 210 on account of improved signal to noise ratio (as the frame rate is increased by combining the chrominance and luminance information and not by decreasing the exposure time for the color image sensor 208, which may adversely affect the signal to noise ratio). As explained above, in FIG. 4, it is assumed that exposure times associated with color image sensor 208 and the panchromatic image sensor 210 are configured to be aligned for capturing frames corresponding to a scene. The alignment of frames and subsequent generation of color frames when the exposure times associated with color image sensor 208 and the panchromatic image sensor 210 are staggered is explained in FIGS. 5A and 5B.

Figure 5A:
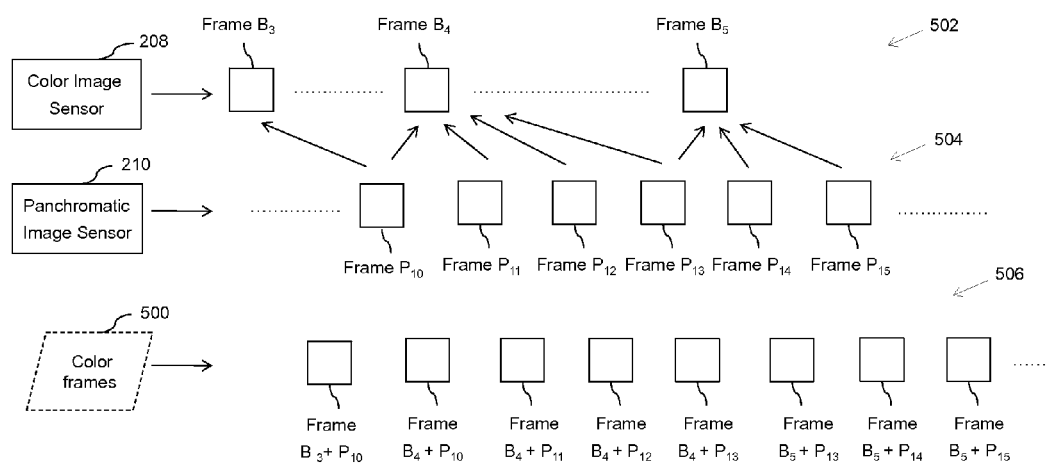
FIGS. 5A and 5B illustrate alignment of frames subsequent to staggering of exposure times associated with the color image sensor and the panchromatic image sensor in accordance with an example embodiment.
Figure 5B:
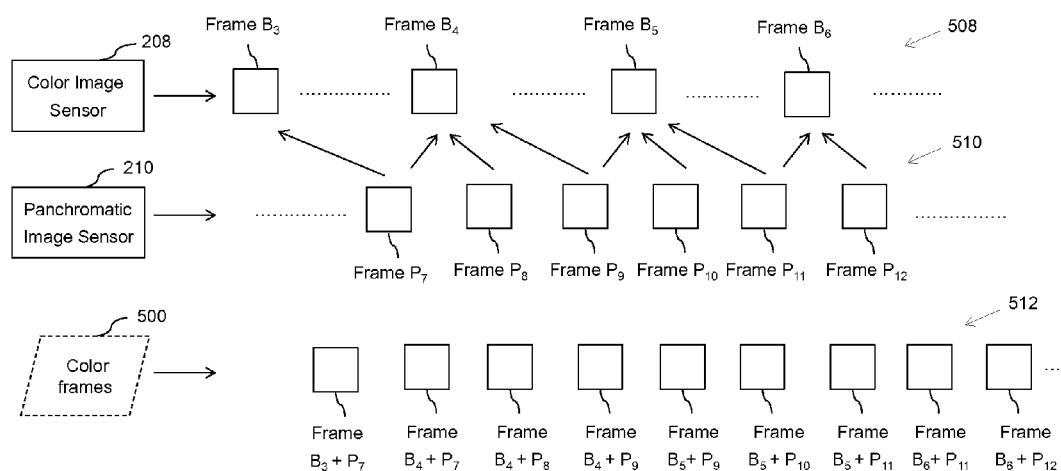

FIGS. 5A and 5B illustrate alignment of frames subsequent to staggering of exposure times associated with the color image sensor 208 and the panchromatic image sensor 210 in accordance with an example embodiment. In FIG. 5A, exposure time associated with the panchromatic image sensor 210 is assumed to be one-third the exposure time associated with the color image sensor 208. In FIG. 5B, exposure time associated with the panchromatic image sensor 210 is assumed to be half the exposure time associated with the color image sensor 208. In an embodiment, the alignment as depicted in FIGS. 5A and 5B may be employed by the apparatus 200 of FIG. 2A prior to generation of color frames 500.

At 502, frames configuring the first set are received from the color image sensor 208. More specifically, an intermediate sequence of frames, such as frame $B_3$, frame $B_4$ and frame $B_5$, in the first set from among a plurality of frames in a sequence are depicted to be received from the color image sensor 208 for illustration purposes. At 504, frames configuring the second set are received from the panchromatic image sensor 210. More specifically, an intermediate sequence of frames, such as frame $P_{10}$, frame $P_{11}$, frame $P_{12}$, frame $P_{13}$, frame $P_{14}$ and frame $P_{15}$ in the second set from among a plurality of frames in a sequence are depicted to be received from the panchromatic image sensor 210 for illustration purposes. It is noted that the frames configuring the first set and the frames configuring the second set correspond to the same scene, i.e., the frames are captured simultaneously and separately by the color image sensor 208 and the panchromatic image sensor 210. In an example embodiment, the captured first set of frames and the second set of frames are received either simultaneously or near simultaneously. As explained in FIG. 2A, panchromatic sensor pixels associated with the panchromatic image sensor 210 are at least twice as sensitive to incident light as the color sensor pixels associated with the color image sensor. Accordingly, a number of frames in the second set is greater than a number of frames in the first set. In FIG. 5A, the exposure time associated with the panchromatic image sensor 210 is assumed to be one-third the exposure time associated with the color image sensor 208 implying that the panchromatic sensor pixels are three times more sensitive to incident light than the color sensor pixels and accordingly the number of frames in the second set is depicted to be three times the number of frames in the first set.

As explained in FIG. 2A, timestamps corresponding to the frames in the first set are configured to fall between timestamps corresponding to the frames in the second set upon staggering of the exposure times associated with the color image sensor 208 and the panchromatic image sensor 210.

For example, timestamp for a frame in the first set, for example frame $B_4$, falls between timestamps corresponding to frames in the second set, for example $P_{10}$ and $P_{11}$. Similarly, timestamp for frame $B_5$ falls between timestamps corresponding to frames $P_{13}$ and $P_{14}$.

The frames in the second set are aligned to the frames in the first set in order to obtain the output of the panchromatic image sensor 210 in view of the color image sensor 208. As explained in FIG. 2A, a frame at a timestamp in the second set is aligned to at least one frame in the first set at a preceding timestamp and a succeeding timestamp of the timestamp of the frame in the second set. For example, in FIG. 5A, the frame $P_{10}$ is aligned to a frame in the first set at a timestamp preceding the timestamp of frame $P_{10}$, for example, to frame $B_3$. Further, the frame $P_{10}$ is also aligned to a frame in the first set at a timestamp succeeding the timestamp of frame $P_{10}$, for example, to frame $B_4$. The frames $P_{11}$ and $P_{12}$ are aligned to a frame in the first set at a timestamp preceding their corresponding timestamps, for example, to frame $B_4$. The timestamp for frames $P_{13}$ and $P_{14}$ interleave a timestamp corresponding to a frame in the first set, for example frame $B_5$. Accordingly, frame $P_{13}$ is aligned to frames $B_4$ and $B_5$, and frame $P_{14}$ is aligned to frame $B_5$ of the first set.

In an example embodiment, the feature points may be computed for frames in the first set and the second set and correspondence information identified between the computed feature points. A warp matrix may be determined based on the correspondence information and the frames in the second set may be aligned to frames in the first set based on warp matrix. In an example embodiment, luminance information corresponding to the frames in the second set may be warped to a gray-scale image configured from the chrominance information corresponding to the frames in the first set based on the warp matrix for aligning the frames.

The luminance information of the frame in the second set, post alignment, may combined with the chrominance information of the frame in the first set (at a preceding timestamp or a succeeding timestamp) for generating the color frames 500 at 506. For example, on aligning frames $P_{10}$ and $B_3$, the warped luminance information corresponding to the frame $P_{10}$ may be combined with chrominance information corresponding to the frame $B_3$ to generate a color frame $B_3+P_{10}$. Similarly, on aligning frames $P_{10}$ and $B_4$, the warped luminance information corresponding to the frame $P_{10}$ may be combined with chrominance information corresponding to the frame $B_4$ to generate a color frame $B_4+P_{10}$. The remaining frames in the second set may similarly be aligned and combined with frames in the first set to generate the color frames 500. As can be seen in FIG. 5A, the frame rate of the color frames 500 is higher than the frame rate of the first set of frames. On account of interleaving of timestamps, some frames in the second set, such as frames $P_{10}$ or $P_{13}$ may be aligned and subsequently combined with more than one frame in the first set and accordingly higher number of color frames 500 may be generated. Such generation of the color frames 500 may be possible as the scene content for close-by frames do not change much at high frame rates. Accordingly, a frame rate of the generated color frames 500 is high, for example, even higher than the frame rate for generated color frames 400 with exposure times associated with the color image sensor 208 and the panchromatic image sensor 210 aligned.

In FIG. 5B, exposure time associated with the panchromatic image sensor 210 is assumed to be half the exposure time associated with the color image sensor 208. Accordingly, a number of frames in the second set is twice the number of frames in the first set At 508, frames configuring the first set are received from the color image sensor 208. More specifically, an intermediate sequence of frames, such as frame $B_3$—$B_6$, in the first set from among a plurality of frames in a sequence are depicted to be received from the color image sensor 208 for illustration purposes. At 510, frames configuring the second set are received from the panchromatic image sensor 210. More specifically, an intermediate sequence of frames, such as frames $P_7$—$P_{12}$ in the second set from among a plurality of frames in a sequence is depicted to be received from the panchromatic image sensor 210 for illustration purposes. It is noted that the frames configuring the first set and the frames configuring the second set correspond to the same scene, i.e., the frames are captured simultaneously and separately by the color image sensor 208 and the panchromatic image sensor 210. In an example embodiment, the captured first set of frames and the second set of frames are received either simultaneously or near simultaneously.

On account of staggering of the exposure times, timestamps corresponding to the frames in the first set are configured to fall between timestamps corresponding to the frames in the second set. For example, timestamp for a frame in the first set, for example frame $B_4$, falls between timestamps corresponding to frames in the second set, for example $P_7$ and $P_8$. Similarly, timestamp for frame $B_5$ falls between timestamps corresponding to frames $P_9$ and $P_{10}$ and timestamp for frame $B_6$ falls between timestamps corresponding to frames $P_{11}$ and $P_{12}$.

The frames in the second set are aligned to the frames in the first set in order to obtain the output of the panchromatic image sensor 210 in view of the color image sensor 208. A frame at a timestamp in the second set is aligned to at least one frame in the first set at a preceding timestamp and a succeeding timestamp of the timestamp of the frame in the second set. For example, in FIG. 5B, the frame $P_7$ is aligned to a frame in the first set at a timestamp preceding the timestamp of frame $P_7$, for example, to frame $B_3$. Further, the frame $P_7$ is also aligned to a frame in the first set at a timestamp succeeding the timestamp of frame $P_7$, for example, to frame $B_4$. The frame $P_8$ is aligned to a frame in the first set at a timestamp preceding its timestamps, for example, to frame $B_4$. The timestamps for frames $P_9$ and $P_{10}$ interleave a timestamp corresponding to a frame in the first set, for example frame $B_5$. Accordingly, frame $P_9$ is aligned to frames $B_4$ and $B_5$. The frame $P_{10}$ is aligned to $B_5$. Similarly, frame $P_{11}$ is aligned to frames $B_5$ and $B_6$ and the frame $P_{12}$ is aligned to $B_6$.

The alignment may be performed as explained in FIG. 5A. Further, post alignment, the luminance information of the frame in the second set may combined with the chrominance information of the frame in the first set (at a preceding timestamp or a succeeding timestamp) for generating color frames 500 at 512. For example, on aligning frames $P_7$ and $B_3$, the warped luminance information corresponding to the frame $P_7$ may be combined with chrominance information of frame $B_3$ to generate a color frame $B_3+P_7$. Similarly, on aligning frames $P_7$ and $B_4$, the warped luminance information corresponding to the frame $P_7$ may be combined with chrominance information of frame $B_4$ to generate a color frame $B_4+P_7$. The remaining frames in the second set may similarly be aligned and combined with frames in the first set to generate the color frames 500. As can be seen in FIG. 4, the frame rate of the color frames 500 is higher than the frame rate of frames in the first set. On account of interleaving of timestamps, some frames in the second set, such as frames $P_7$, $P_9$ and $P_{11}$ may be aligned and subsequently combined with more than one frame in the first set and accordingly higher number of color frames 500 may be generated. A method for capturing video content is explained in FIG. 6.

Figure 6:
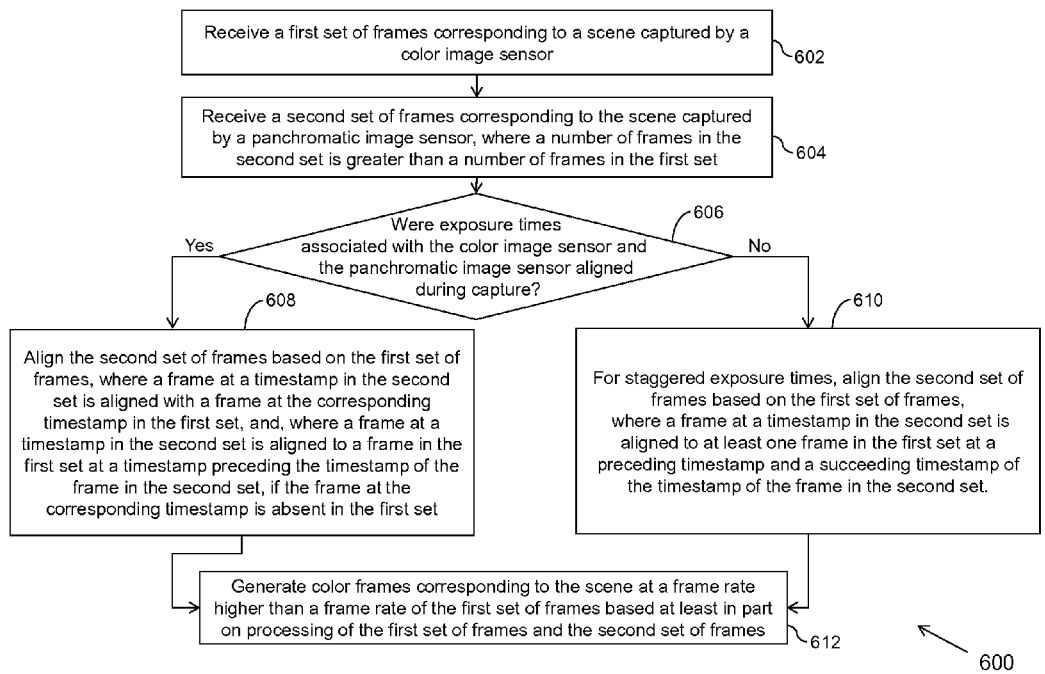
FIG. 6 is a flowchart depicting an example method for capturing video content in accordance with an example embodiment.

FIG. 6 is a flowchart depicting an example method 600 for capturing video content in accordance with an example embodiment. The method 600 depicted in flow chart may be executed by, for example, the apparatus 200 of FIG. 2A. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 600 are described with help of apparatus 200 of FIG. 2A. However, the operations of the method can be described and/or practiced by using any other apparatus.

At block 602 of method 600, a first set of frames corresponding to a scene is received from a color image sensor, such as the color image sensor 208. The scene may include one or more objects in a surrounding environment, for example, a person or a gathering of individuals, birds, books, a playground, natural scenery, such as a mountain, and the like. In an example embodiment, the color image sensor may be an image sensor on which a color filter array (CFA) is disposed. Image sensors constructed using semiconductor materials such as CMOS based sensors, or charged coupled devices (CCD) sensors are not color or wavelength sensitive, and therefore the CFA is disposed over such color image sensors. In an example embodiment, the CFA includes color sensor pixels, such as those for colors red, green and blue (RGB), disposed in a mosaic pattern over the color image sensor for sampling respective colors corresponding to the captured scene. The sampled values obtained from these color sensor pixels, after interpolation, configure image pixels. Since each image pixel is filtered to record only one of three colors, the data from each pixel cannot fully determine color on its own. To obtain a full-color image, various demosaicing algorithms may be employed to interpolate a set of complete red, green, and blue values for each image pixel corresponding to a captured frame.

In an example embodiment, the color image sensor may include a Bayer CFA configured to provide one of RGB and cyan, magenta, and yellow (CMY) color patterns. In an example embodiment, the Bayer CFA filter pattern may include twice as many green image pixels as red or blue to mimic the physiology of the human eye, which is more sensitive to green light as compared to red and blue. Accordingly, the filter pattern may be 50% green, 25% red and 25% blue, and may also be called as RGBG, GRGB, or RGGB color pattern. In an example embodiment, demosaicing of the image samples received from the CFA may be performed to generate the first set of frames. In an example embodiment, the first set of frames comprises chrominance information (for example, primary color information, such as an RGB information) corresponding to the captured scene.

At block 604, a second set of frames corresponding to a scene is received. In an example embodiment, the second set of frames is captured by a panchromatic image sensor, such as the panchromatic image sensor 210 of the apparatus 200. In an example embodiment, the second set of frames comprises luminance information (e.g., gray scale information) corresponding to the captured scene. In an example embodiment, the panchromatic image sensor may include or may be associated with panchromatic sensor pixels. In an example embodiment, a CFA (for example, a panchromatic filter) including panchromatic sensor pixels may be disposed over the panchromatic image sensor. It is noted that the panchromatic image sensor and the color image sensor capture frames corresponding to the scene simultaneously. The first set of frames and the second set of frames are captured simultaneously and correspond to the same scene. In an example embodiment, the captured first set of frames and the second set of frames are received either simultaneously or near simultaneously. In an example embodiment, sensitivity to incident light corresponding to the captured scene of the panchromatic image sensor is greater than or equal to twice the sensitivity of the color image sensor. More specifically, the panchromatic sensor pixels associated with the panchromatic image sensor have sensitivity to incident light which is greater than or equal to twice the sensitivity of the color sensor pixels associated with the color image sensor. As a result of the greater sensitivity, for a given scene illumination, the panchromatic image sensor may be capable of capturing at least twice the number of frames than a number of frames captured by the color image sensor. Alternatively, the panchromatic image sensor may capture the same number of frames as that captured by the color image sensor in nearly half the exposure time configured for the color image sensor. In an example embodiment, the panchromatic sensor pixels are approximately three times more sensitive to light than color sensor pixels corresponding to the color image sensor. For example, if a scene lighting is such that the exposure time required for the color image sensor is 33 ms (implying that a frame rate for the color image sensor is 1000/33=~30 fps), then the exposure time required for the panchromatic image sensor will be less than or equal to 16 ms to obtain approximately similar brightness.

At block 606, it is determined whether the exposure times associated with the color image sensor and the panchromatic image sensor were aligned during capturing frames corresponding to the scene. If it is determined that the exposure times were aligned, then at block 608, the second set of frames is aligned based on the first set of frames. Alternatively, in an example embodiment, the first set of frames may be aligned based on the second set of frames. The alignment, for example warping, may be performed in order to obtain the output of one image sensor, such as the panchromatic image sensor in view of the second image sensor, such as the color image sensor. This may be done as the two image sensors, even though capturing the same scene may capture the information with slight difference on account of difference in an angle of capture. Accordingly, alignment of pixels may be performed to obtain the view of one image sensor in terms of other image sensor. Accordingly, a warp may be computed to obtain the output of panchromatic image sensor in the view of the color image sensor. In some embodiments, it may be preferable to compute the warp for obtaining the output of the color image sensor in the view of the panchromatic image sensor for reasons explained in FIG. 2A. In an example embodiment, the warp may be computed as an 8 parameter transform (for example, using standard techniques, such as similarity, homography, affine and the like) or may be computed using a dense correspondence computed for a stereo camera.

In an example embodiment, a frame at a timestamp in the second set is aligned with a frame at the corresponding timestamp in the first set. Further, a number of frames in the second set is higher than the number of frames in the first set on account of higher number of frames captured by panchromatic sensor pixels associated with the panchromatic image sensor. Accordingly, there may be frames in the second set which may not have any frames in the first set with matching timestamps. In an example embodiment, a frame at a timestamp in the second set is aligned to a frame in the first set at a timestamp preceding the timestamp of the frame in the second set, if the frame at the corresponding timestamp is absent in the first set. The alignment of the frames in the second set (at matching timestamp and preceding timestamp) may be performed as explained in FIG. 4.

If it is determined that the exposure times were not aligned then for staggered exposure times, at block 608, the second set of frames is aligned based on the first set of frames. A frame at a timestamp in the second set is aligned to at least one frame in the first set at a preceding and a succeeding timestamp of the timestamp of the frame in the second set. In an example embodiment, timestamps corresponding to the frames in the first set are configured to fall between timestamps corresponding to the frames in the second set upon staggering the exposure times associated with the color image sensor and the panchromatic image sensor. In an example embodiment, timestamps for frames in the first set may fall between (for example, interleave) timestamps of frames in the second set as illustrated in FIGS. 5A and 5B. In an example embodiment, a frame at a timestamp in the second set is aligned to at least one frame in the first set at a preceding timestamp and a succeeding timestamp of the timestamp of the frame in the second set. For example, a frame in the second set at a timestamp of $16^{th}$ second may be aligned to frame in the first set at timestamp of $11^{th}$ second, i.e. preceding timestamp, and, a frame in the first set at timestamp of $17^{th}$ second i.e. succeeding timestamp.

In an example embodiment, for alignment purposes, a warp matrix may be determined based on feature points associated with a frame in the second set and feature points associated with a frame in the first set. Examples of the feature points may include, but are not limited to, corners, edges of an image, or other region of interest such as background of the scene. In an example embodiment, a gray scale conversion of a frame in the first set may be performed and feature points associated with the gray scale image may be determined. In an example embodiment, algorithms such as scale-invariant feature transform (SIFT), Harris corner detector, smallest univalue segment assimilating nucleus (SUSAN) corner detector, features from accelerated segment test (FAST) for determining feature points associated with the gray scale image and the frame in the second set. In an example embodiment, correspondence information between the feature points associated with the gray scale image corresponding to the frame in the first set and the feature points associated with the frame in the second set may be determined. In an example embodiment, the correspondence information may be determined using algorithms such as random sample consensus (RANSAC). In an example embodiment, the warp matrix may be computed based on the correspondence information. In an example embodiment, a frame in the second set may be warped corresponding to the frame in the first set using the warp matrix.

In an example embodiment, chrominance information associated with a frame in the first set may be computed. In an example embodiment, the chrominance information of the frame in the first set may be determined by decomposing the frame into a luminance-chrominance format. In an example embodiment, the chrominance information of the frame in the first set (for example, the RGB image) may be denoised to generate smooth chrominance information. In an example embodiment, the luminance information corresponding to a frame in the second set may be warped corresponding to the denoised chrominance information using the warp matrix.

In an example embodiment, at least one of deblurring of the frames of the first set and increasing a brightness associated with the frames of the first set is performed prior to aligning the frames of the first set and the second set. In an example embodiment, a brightness associated with the frames of the first set is lesser than that of the frames in the second set for a given set of capture parameters. In an example embodiment, the brightness associated with the frames of the first set is significantly lesser than that of the frames in the second set for a given set of capture parameters. In an example embodiment, if the brightness associated with the frames of the first set is significantly lesser than that of the frames in the second set for a given set of capture parameters, then the brightness associated with the frames of the first set may be increased by using a gain (for example, by using an amplifier) to preclude a de-saturation of color in generated color frames as a perception of color and color saturation is dependent upon the corresponding luminance level. In an example embodiment, the gain may either be applied based on pre-determined manual and/or automatic configurations or alternatively may be applied based on relative brightness of the frames in the first set and the frames in the second set. In such a case where a gain needs to be applied to the frames of the first set to preclude the loss of color information, an increase in noise component with the corresponding increase in gain is observed. To alleviate the increase in the noise component, a denoising algorithm may be applied on the frames of the first set or selectively to the chrominance information (before or after alignment) by using various techniques. Examples of such techniques may include but are not limited to a sigma filter, a bilateral filter and wavelet based methods.

In some exemplary scenarios, the frames corresponding to the scene may be captured in less than ideal conditions. For example, the captured scene may include moving visuals or the image sensor may not be steady while capturing the frames corresponding to the scene or both. In such scenarios, the captured frames may include blurring of content, which may produce a distorting effect on the details included in the frames. The blurring effect may especially affect the frames in the first set as an exposure time associated with the color image sensor may be higher than the exposure time associated with the panchromatic image sensor. In an example embodiment, deblurring algorithms may be employed for de-blurring (for example, correcting the frames from the blurring effect) before warping the chrominance information and determining the dense correspondence with respect to the luminance information included in the second set of frames. In an embodiment, the deblurring algorithms may involve computing a blur kernel for deblurring the chrominance information. In an example embodiment, the blur kernel may be computed either in a blind manner or using the unblurred frames from the second set. In an example embodiment, such deblurring may reduce the motion blur in the frames of the first set and improve the subjective quality of the generated color frames.

At block 610, color frames corresponding to the scene are generated at a frame rate higher than a frame rate of the first set of frames based at least in part on processing of the first set of frames and the second set of frames. In an example embodiment, the processing of the first set of frames and the second set of frames comprises combining the chrominance information and the luminance information for generating the color frames corresponding to the captured scene. The combining of the chrominance information and the luminance information for generating the color frames may be achieved by employing various fusion techniques.

In an example embodiment, each color frame may be generated based on processing the warped frame in the second set and the chrominance information of the frame in the first set. In an example embodiment, the warped luminance information of the frame in the second set may be combined with the chrominance information of the frame in the first set to generate a color frame, as explained in FIG. 4. In an example embodiment, the generated color frames are improved frames in terms of quality from frames individually received from the panchromatic image sensor and the color image sensor.

In an example embodiment, the color frames corresponding to the scene are generated at a frame rate higher than a frame rate of the first set of frames. As explained, the number of frames in the second set are higher than a number of frames in the first set. A higher number of frames in the second set is aligned to the frames in the first set (either at matching timestamp or at a preceding timestamp) and subsequent to alignment, the luminance information and the chrominance information is combined to generate a higher number of color frames as explained in FIG. 4. Further, staggering of exposure times enables one or more frames in the second set to align (and subsequently combine) to more than one frames in the first set as the scene content with close-by frames do not change much at high frame rates. Accordingly, a frame rate of the generated color frames is high, for example, even higher than the frame rate for generated color frames with aligned exposure times for the color image sensor and the panchromatic image sensor.

In an example embodiment, a processing means may be configured to perform some or all of: receiving a first set of frames corresponding to a scene captured by a color image sensor; receiving a second set of frames corresponding to the scene captured by a panchromatic image sensor, wherein a number of frames in the second set is greater than a number of frames in the first set; and generating color frames corresponding to the scene at a frame rate higher than a frame rate of the first set of frames based at least in part on processing of the first set of frames and the second set of frames. An example of the processing means may include the processor 202, which may be an example of the controller 108. Another method for capturing video content is explained in detail with reference to FIG. 7.

Figure 7:
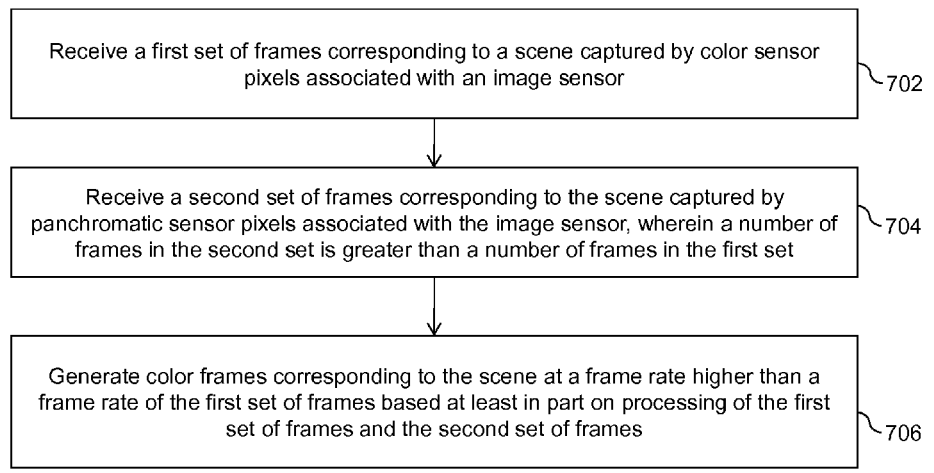
FIG. 7 is a flowchart depicting an example method for capturing video content in accordance with another example embodiment.

FIG. 7 is a flowchart depicting an example method 700 for capturing video content in accordance with another example embodiment. The apparatus 200 of FIG. 2B may employ the method 700 for capturing video content. An image sensor, such as an image sensor 214, including color sensor pixels and panchromatic sensor pixels may be employed for capturing video content. In an example embodiment, a color filter array (CFA) may be disposed over the image sensor. In an example embodiment, the CFA associated with the image sensor may include color sensor pixels and panchromatic sensor pixels. In an example embodiment, the CFA may include a RGBW color filter pattern. More specifically, CFA may include color sensor pixels such as those for red, green and blue (RGB) colors in addition to the panchromatic sensor pixels (also referred as a White pixels or W). The color sensor pixels and the panchromatic sensor pixels may be disposed in a mosaic pattern (for example, RGBW color filter pattern) over the image sensor for sampling respective chrominance-luminance information corresponding to the captured scene.

At block 702 of method 700, a first set of frames (for example, the first set of frames as explained in FIG. 2A) corresponding to a scene captured by color sensor pixels associated with an image sensor is received. In an example embodiment, demosaicing of the image samples received from the color sensor pixels may be performed to generate the first set of frames. In an example embodiment, the first set of frames comprises chrominance information (e.g., primary color information, such as an RGB information) corresponding to the captured scene.

At block 704, a second set of frames corresponding to the scene captured by a panchromatic sensor pixels associated with the image sensor is received. A number of frames in the second set is greater than a number of frames in the first set. In an example embodiment, the second set of frames comprises luminance information (e.g., gray scale information) corresponding to the captured scene. The panchromatic sensor pixels have a higher sensitivity to incident light corresponding to the captured scene and its sensitivity is greater than or equal to twice the sensitivity of the color sensor pixels associated with the image sensor. In an example embodiment, the panchromatic sensor pixel may have a separate exposure control and independent read out (for example, sampling) mechanism. For example, the panchromatic sensor pixels may be read out two times for each RGB pixels sampling, and demosaicing may be performed to obtain a frame for the second set. On account of higher sensitivity to incident light of the panchromatic sensor pixels a number of frames in the second set is greater than a number of frames in the first set.

At block 706, color frames corresponding to the scene are generated at a frame rate higher than a frame rate of the first set of frames based at least in part on processing of the first set of frames and the second set of frames. In an example embodiment, processing of the first set of frames and the second set of frames comprises combining the chrominance information and the luminance information of frames for generating the color frames corresponding to the captured scene. The combining of the chrominance information and the luminance information for generating the color frames may be achieved by employing various fusion techniques. In an example embodiment, the generation of the color frames based on the first set of frames and the second set of frames may be performed as explained in FIG. 2A. In an example embodiment, the generation of color frames may preclude alignment of second set of frames based on the first set of frames.

To facilitate discussion of the methods 600 and/or 700 of FIGS. 6 and 7, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein. Moreover, certain operations of the methods 600 and/or 700 are performed in an automated fashion. These operations involve substantially no interaction with the user. Other operations of the methods 600 and/or 700 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to capture video content. As explained in FIGS. 2-7, a scene may be captured simultaneously using a color image sensor, such as the color image sensor 208, and panchromatic image sensor, such as the panchromatic image sensor 210. The luminance information from the panchromatic image sensor, post-alignment, may be combined and chrominance information from the color image sensor to generate color frames at a rate higher than the frame rate of the frames captured by the color image sensor. The frame rate can be increased by two to three times the frame rate captured by the single color image sensor. The staggering of exposure times associated with the color image sensor and the panchromatic image sensor enables configuring of an even higher frame rate as explained in FIGS. 5A and 5B. The higher frame rate may especially be useful when viewing video content corresponding to the captured scene on extremely large displays, as the video will appear smoother and precluding jerks and discontinuities. Moreover, a quality of the generated color frames is also better than the frames captured by either of the color image sensor or panchromatic image sensor on account of improved signal to noise ratio (as the frame rate is increased by combining the chrominance and luminance information and not by decreasing the exposure time for the color image sensor which adversely affects the SNR). The improved SNR is especially useful in low lighting conditions, as the frame rate need not have to traded-off for increasing exposure rates for improving quality of the frames. Further, various embodiment suggest utilization of a single image sensor configured with a RGBW color filter pattern for improving frame rate of video content.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

I claim:

1. A method comprising:
   receiving a first set of frames corresponding to a scene captured by a color image sensor;
   receiving a second set of frames corresponding to the scene captured by a panchromatic image sensor, wherein a number of frames in the second set is greater than a number of frames in the first set; and
   generating color frames corresponding to the scene at a frame rate higher than a frame rate of the first set of frames based at least in part on processing of the first set of frames and the second set of frames;
   wherein the second set of frames is aligned based on the first set of frames prior to generating the color frames.

2. The method as claimed in claim 1, wherein sensitivity to incident light corresponding to the captured scene of the panchromatic image sensor is greater than or equal to twice the sensitivity of the color image sensor.

3. The method as claimed in claim 1, wherein the first set of frames comprises chrominance information corresponding to the captured scene.

4. The method as claimed in claim 3, wherein the second set of frames comprises luminance information corresponding to the captured scene.

5. The method as claimed in claim 4, wherein the processing of the first set of frames and the second set of frames comprises combining the chrominance information and the luminance information for generating the color frames corresponding to the captured scene.

6. The method as claimed in claim 5, wherein a frame at a timestamp in the second set is aligned to a frame at the corresponding timestamp in the first set.

7. The method as claimed in claim 5, further comprising staggering exposure times associated with the color image sensor and the panchromatic image sensor, wherein timestamps corresponding to the frames in the first set are configured to fall between timestamps corresponding to the frames in the second set upon staggering of the exposure times.

8. The method as claimed in claim 4, further comprising performing at least one of deblurring of the frames of the first set and increasing a brightness associated with the frames of the first set prior to aligning the frames of the first set and the second set.

9. An apparatus comprising:
   at least one processor; and
   at least one memory comprising computer program code, the at least one memory and the computer program code configured to, with the at least one processor, cause the apparatus to at least perform:
   receive a first set of frames corresponding to a scene captured by a color image sensor;
   receive a second set of frames corresponding to the scene captured by a panchromatic image sensor, wherein a number of frames in the second set is greater than a number of frames in the first set; and
   generate color frames corresponding to the scene at a frame rate higher than a frame rate of the first set of frames based at least in part on processing of the first set of frames and the second set of frames;

wherein the second set of frames is alined based on the first set of frames prior to generating the color frames.

10. The apparatus as claimed in claim 9, wherein sensitivity to incident light corresponding to the captured scene of the panchromatic image sensor is greater than or equal to twice the sensitivity of the color image sensor.

11. The apparatus as claimed in claim 9, wherein the first set of frames comprises chrominance information corresponding to the captured scene.

12. The apparatus as claimed in claim 11, wherein the second set of frames comprises luminance information corresponding to the captured scene.

13. The apparatus as claimed in claim 12, wherein the processing of the first set of frames and the second set of frames comprises combining the chrominance information and the luminance information for generating the color frames corresponding to the captured scene.

14. The apparatus as claimed in claim 13, wherein the apparatus is further caused, at least in part, to align a frame at a timestamp in the second set to a frame at the corresponding timestamp in the first set.

15. The apparatus as claimed in claim 13, wherein the apparatus is further caused, at least in part, to stagger exposure times associated with the color image sensor and the panchromatic image sensor, wherein timestamps corresponding to the frames in the first set are configured to fall between timestamps corresponding to the frames in the second set upon staggering of the exposure times.

16. The apparatus as claimed in claim 12, wherein the apparatus is further caused, at least in part, to perform at least one of deblurring of the frames of the first set and increasing a brightness associated with the frames of the first set prior to aligning the frames of the first set and the second set.

17. A computer program product having at least one non-transitory computer-readable storage medium, the computer-readable storage medium comprising a set of instructions, which, when executed by one or more processors, cause an apparatus to at least perform:

receive a first set of frames corresponding to a scene captured by a color image sensor;

receive a second set of frames corresponding to the scene captured by a panchromatic image sensor, wherein a number of frames in the second set is greater than a number of frames in the first set; and generate color frames corresponding to the scene at a frame rate higher than a frame rate of the first set of frames based at least in part on processing of the first set of frames and the second set of frames;

wherein the second set of frames is aligned based on the first set of frames prior to generating the color frames.

18. The computer program product as claimed in claim 17, wherein sensitivity to incident light corresponding to the captured scene of the panchromatic image sensor is greater than or equal to twice the sensitivity of the color image sensor.

19. The computer program product as claimed in claim 17, wherein the first set of frames comprises chrominance information corresponding to the captured scene and the second set of frames comprises luminance information corresponding to the captured scene.

20. The computer program product as claimed in claim 19, wherein the processing of the first set of frames and the second set of frames comprises combining the chrominance information and the luminance information for generating the color frames corresponding to the captured scene.

* * * * *

UNITED STATES PATENT AND TRADEMARK OFFICE
CERTIFICATE OF CORRECTION

PATENT NO. : 9,232,199 B2  
APPLICATION NO. : 13/923641  
DATED : January 5, 2016  
INVENTOR(S) : Krishna Annasagar Govindarao Page 1 of 1

It is certified that error appears in the above-identified patent and that said Letters Patent is hereby corrected as shown below:

Claims

In Claim 9:
Column 31, line 3, "alined" should be deleted and --aligned-- should be inserted.

Signed and Sealed this
Twenty-sixth Day of April, 2016

Michelle K. Lee
*Director of the United States Patent and Trademark Office*